Sept. 20, 1966     T. H. BENZINGER     3,273,968
HEAT-BURST MICROCALORIMETER
Filed March 23, 1960     5 Sheets-Sheet 1
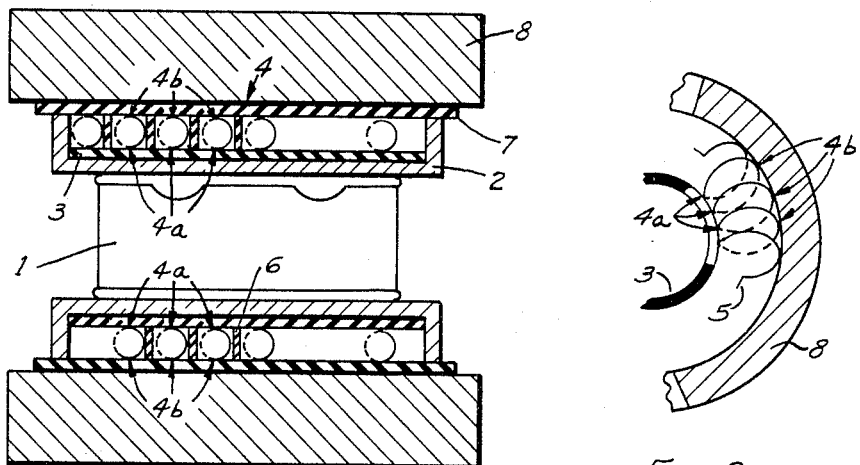
FIG. 1
FIG. 2
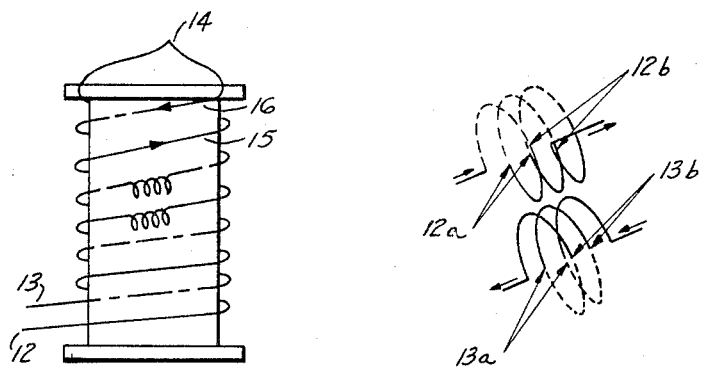
FIG. 3
FIG. 4
INVENTOR.
THEODOR H. BENZINGER
BY Sept. 20, 1966  T. H. BENZINGER  3,273,968
HEAT-BURST MICROCALORIMETER Filed March 23, 1960  5 Sheets-Sheet 3

INVENTOR.
THEODOR H. BENZINGER
BY

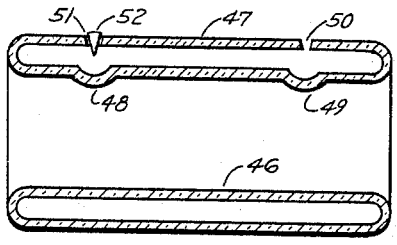
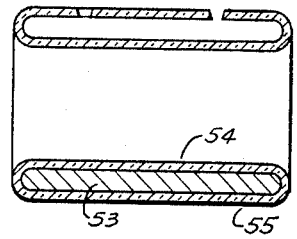
FIG. 8   FIG. 9
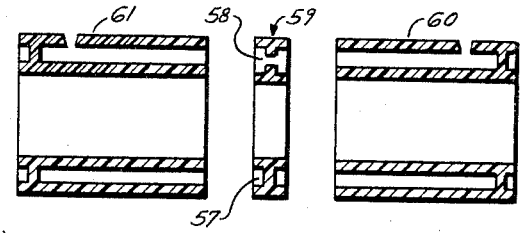
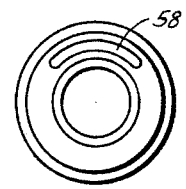
FIG. 10   FIG. 11
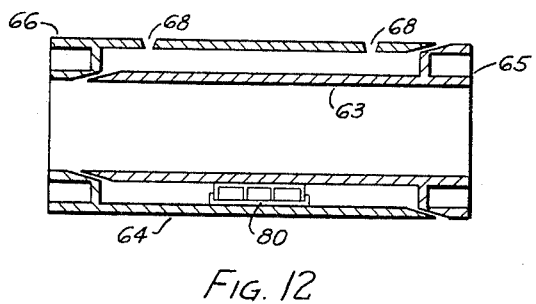
FIG. 12

Sept. 20, 1966  T. H. BENZINGER  3,273,968
HEAT-BURST MICROCALORIMETER

Filed March 23, 1960  5 Sheets-Sheet 5

INVENTOR.
THEODOR H. BENZINGER
BY

3,273,968
HEAT-BURST MICROCALORIMETER
Theodor H. Benzinger, Holly Oaks, Tilden Lane,
Rockville, Md.
Filed Mar. 23, 1960, Ser. No. 17,232
15 Claims. (Cl. 23—253)

The invention described herein may be manufactured and used by or for the Government of the United States of America for governmental purposes without the payment of any royalties thereon or therefor.

The present invention relates generally to calorimetric systems and techniques and, more particularly, to apparatus for and methods of determining the precise magnitude and rate of heat flow produced as a consequence of chemical or biochemical reactions and the like.

Since heat is liberated or absorbed in relation to the occurrence, rate, extent or quantity of any chemical change, calorimetry may become a recognized analytical tool, universally applicable for the quantitative investigation of chemical reactions. One of the limitations restricting its application, however, is the requirement that only the reaction under study and no other heat producing or absorbing process be present during the analytical observation. This shortcoming is more than offset by the fact that calorimetric equipment and processes are not disturbed by the mere presence of any variety or quantity of other inert materials. Moreover, they do not require any physical or chemical interference in the system under study nor require any specific properties of the reactants or products such as optical characteristics, precipitation of a solid, or liberation of a gas.

The classical approaches for measuring entropy and energy by, for example, low temperature physics and bomb calorimetry are in the main relatively cumbersome and prone to error since they measure relatively small differences between large quantities. Also, the conventional equipment requires substantial amounts of materials, a characteristic which often precludes their employment in biochemical work. The inability of these systems to detect very small amounts of heat which last for brief moments also prevents their effective use in biochemical experiments.

In classical calorimetry, heat is defined as the product of a change in temperature with the heat capacity of the system in which it occurs. Conventional calorimetric procedures, therefore, involve the measurement or compensation of a temperature difference between a blank or a heat sink and the reactant solution in a thermally insulated vessel. With these methods, the difference of temperature between the two systems available as a potential source of energy is not utilized. Stated somewhat differently, after the temperature difference is once determined, this differential, which may be considered the potential thermal energy of the system, remains untapped. When thermal equilibrium is reached or when balancing quantities of energy are supplied to the blank and measured, the potential thermal energy just referred to disappears. With the principle and method of heat-burst microcalorimetry, this potential thermal energy is fully utilized to produce the signal and thereby to improve the sensitivity of the temperature detecting apparatus.

To understand the heat-burst principle, consider the case in classical calorimetry where an instantaneous reaction is proceeding in a bulk of solutions, this bulk being effectively suspended in perfect thermal isolation except for the conductance of a single pair of copper-constantan conductors extending between the reacting bulk and a heat sink. As is well known, at the junction of these dissimilar conductors, a very small potential appears and this potential lasts almost indefinitely if the conductors have an infinitesimally small cross section. Of course, the heat eventually leaks out almost unnoticed through the conductance of the thermocouple wires but, if the magnitude of the potential is taken immediately, no further use is made of the temperature differential present in the system.

Consider the case, now, where the bulk solutions, instead of carrying one or a few thermocouples, is spiked throughout its volume with an almost infinite number of thermocouples, each measuring the temperature in an almost infinitesimally small segment of the solutions. A potential will be developed in each of the individual couples in response to the instantaneous chemical reaction. The magnitude of each of these potentials will, of course, be the same as that registered with the single thermocouple in the previous system. In each case, of course, the magnitude is determined uniquely by the rise in temperature brought about by the chemical reaction. In contrast with the measurement by a single thermal junction, the potentials appearing at the multiple couples will not persist. Rather, they will decay quite rapidly in an exponential fashion since the multiple conduction paths provided by the numerous thermocouple wires effectively drain the heat from the reaction vessel into the heat sink within a relatively short time. Before the heat is exhausted, however, the temperature level of the system can be recorded with electronic instruments designed to record transient or rapidly recurring voltage wave forms. What is most important, however, is that all of the individual signals occurring at the different thermal junctions can be combined additively by serially connecting the thermocouples. The resultant signal would then have a peaked wave form and its amplitude at any one time could be analyzed to indicate the behavior of the chemical reaction under study. In the prior art methods, the amplitude of the output signal is relatively small and its duration relatively long, a characteristic which is of no particular value in the measuring operation.

It may be appropriate at this point to explain the fundamental difference between the heat-burst principle and the application of multijunction thermopiles in prior art calorimetric apparatus. In the latter case, the thermopiles are resorted to in order to enhance the sensitivity of the temperature measurement at a certain site within the bulk solution with a minimum of heat loss through the thermopile. A typical part-time response for instruments of this type is somewhat in the order of 20,000 seconds. In contradistinction, the heat-burst principle of the present invention discharges the heat at a maximum velocity from every segment of the solution into a heat sink through a multiplicity of cooperating thermopiles, the energy of the thermal flux thereby being converted entirely and immediately into a short but powerful electrical signal.

According to one feature of the present invention, the bulk solutions are spread over the surface of a hollow, double-walled, cylindrical vessel, an arrangement which allows a multiplicity of thermal junctions to cooperate with relatively small segments of the solution. The outer wall of the reaction vessel is put in thermal contact throughout most of its area with what might be called an "area thermopile." This pile in appearance is somewhat like a carpet structure of copper-constantan conductors arranged physically in parallel for thermal conduction and in series for electrical conduction. Each of these conductors extends between the outer surface of the reaction vessel and the heat sink. This configuration has several main advantages, namely, the thermoelectric potentials are additive for multiplication of the signal response, the problems and imperfections involved in thermal insulation are eliminated because the solution is kept in solid thermal contact with the heat sink via the thermopile over substantially all of its entire surface. Furthermore, disturbing influences of external temperature variations are reduced by shortening the time of response of the instrument and likewise the duration of the measurement. Thus, by means of the heat-burst principle, sensitivity to instantaneous reactions is increased, speed of response to changing rates of heat flow is improved, inertial distortions are reduced and external disturbances are minimized. Such characteristics are desirable in biochemical investigations involving enzyme kinetics, virus-host relationships, invasion of cells, fertilization and mitosis. Furthermore, the increased speed of response available enhances the power of resolution in heat measurements of the type wherein it is desired to investigate independently an initial heat-burst event followed by continued heat production. This is the case, for example, when enzyme substrate-combination or ionic interactions precede the slow enzymic transformation of a substrate.

In order to exploit fully the advantages of the heat-burst principle, further steps are taken in the present invention to minimize external thermal disturbances which may be present even for the short durations involved. The required compensation is achieved by utilizing the concept of twin calorimetry, a technique which minimizes any errors that would otherwise arise because of temperature fluctuations of the heat sink. Thus, in a preferred embodiment of the invention, identical reaction and blank vessels are housed within the same heat sink and each provided with an identical area thermopile.

In order to eliminate the need for mechanical stirring devices, a source of error in the prior art equipment, the calorimeter of the present invention is mounted so that gravitational forces acting on the reactant liquids are the only forces used for carrying out the mixing and stirring operations. However, since the mechanical suspension of the apparatus provides an inroad for thermal disturbances from the outside, the necessary supporting structure is located in the plane of symmetry between the blank and the reaction thermopiles. Thus, heat introduced via the suspension mechanism affects both thermopiles in a similar manner, a fact that allows this disturbance to be canceled out in the measuring system.

It is accordingly a primary object of the present invention to provide a heat-burst microcalorimeter for determining free energy, enthalpy and entropy changes.

A further object of the present invention is to provide a heat-burst microcalorimeter for use in biochemical investigations.

A still further object of the present invention is to provide a heat-burst calorimeter, the response time of which is sufficiently short to permit its utilization in biochemical or biological applications.

A still further object of the present invention is to provide a microcalorimeter which can be operated at room temperature.

A yet still further object of the present invention is to provide a microcalorimeter which makes use of the potential thermal energy existing in a system in the form of a difference in temperature between a chemical solution in its reaction state and an affiliated constant temperature heat sink.

A yet still further object of the present invention is to provide a microcalorimeter wherein substantially all of the heat produced by a chemical reaction goes into the development of a short but powerful electrical signal.

Another object of the present invention is to provide a microcalorimeter whose precision is unaffected to a large degree by external changes in temperature.

A still further object of the present invention is to provide a calorimeter wherein gravitational forces alone are used for mixing and stirring the reactants.

A yet still further object of the present invention is to provide a microcalorimeter wherein an area thermopile senses the temperature at a multiplicity of discrete points in a bulk solution whereby the threshold of temperature measurement is lowered.

A still further object of the present invention is to provide a microcalorimeter wherein the reactant solutions are spread over a maximum surface for achieving optimum thermal contact with a cooperating area thermopile.

A further object of the present invention is to provide an arrangement for supporting the heat sink of a calorimeter such that a minimum amount of thermal conduction from the outside occurs.

A still further object of the present invention is to provide a calorimeter mounting arrangement which is capable of two degrees of movement for carrying out by gravitational forces the mixing operation.

A yet still further object of the present invention is to provide a thermopile structure capable of sensing a maximum number of hot and cold adjacent temperature locations.

Other objects and many of the attendant advantages of this invention will be readily appreciated as the same becomes better understood by reference to the following detailed description when considered in connection with the accompanying drawings wherein:

FIG. 1 is a cross section of a part of a microcalorimeter constructed according to the present invention which illustrates the heat-burst principle above discussed;

FIG. 2 is a partial section depicting the manner in which the area thermopile cooperates with the reaction vessel and the heat sink;

FIG. 3 illustrates an alternative winding arrangement for minimizing induction currents in the measuring system;

FIG. 4 depicts in schematic form the electrical behavior of confronting turns of adjacent coils of the area thermopile;

FIG. 8 is a cross section of one type of reaction vessel that can be used in the present invention;

FIG. 9 illustrates a reaction vessel in which the various fluids are normally kept apart by a longitudinal divider;

FIG. 10 illustrates a bicompartmented reaction vessel;

FIG. 11 shows the details of the joiner ring of FIG. 10;

FIG. 12 depicts an alternative construction for a reaction vessel;

Figure 5:
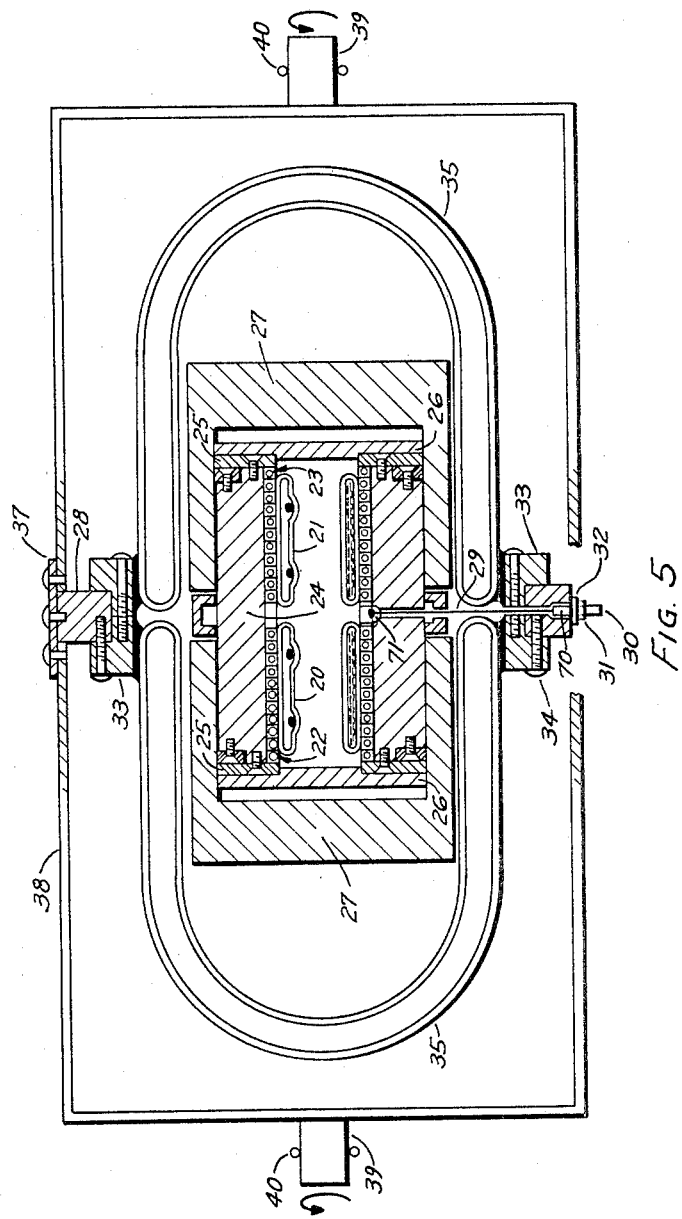
FIG. 5 is a longitudinal section of a preferred embodiment of the present invention wherein the twin calorimeter concept is employed.

Referring now to FIG. 1, which graphically illustrates the operating principle of the present invention, a reaction vessel 1, containing the bulk solutions and taking the physical form of a double-walled, cylindrical section closed at both extremities, is disposed within a metallic shell 2. The inner diameter of this shell and the outer diameter of the vessel are approximately equal so that maximum thermal contact is established between confronting surfaces of these components. Secured to the outer surface of shell 2 is a sheet or layer of electrical insulation 3 made of mica or any other suitable dielectric material. For additional electrical protection, shell 2 may be made of aluminum and its outer wall anodyzed. Contacting sheet 3 and, hence, in close thermal contact with the outer surface of the shell is an area thermopile 4 made up of a multiplicity of thermal junctions, identified by arrows 4a and 4b. These junctions, which may number in the thousands, are produced by winding a constantan conductor 5, shown in FIG. 2 in a helical fashion, and copperplating half of each individual turn thereof, the dissimilar metallic sections being represented by the dotted and solid lines in the above figure. The junctions between the plated and nonplated portions which serve as the temperature-sensing elements thus occur at diametrically opposite points of each turn of the helical wire. After the thermal junctions are so fabricated, the helical structure is coiled about the entire outer surface of the insulated shell so that alternate junctions confront the sheet of insulation 3. Flat, annular, spacer rings 6, made of Bakelite, for example, each slit through in one place by a radial cut, are inserted one after the other between individual turns as the helical winding wire is wound in place; the sequence of rings thus forms a continuous spiral separating the adjacent turns electrically. The assembly is enclosed within heat sink 8, a cylindrical, metallic section having a relatively thick wall dimension. Shorting of the thermal junctions 4b which confront the inner wall surface of the heat sink is prevented by an insulating layer or sheet 7 disposed between these surfaces.

From an examination of FIG. 2, it will be readily seen that thermal junctions 4a are in a tangential relationship with insulating sheet 3 and, therefore, effectively sense the temperatures at a multiplicity of discrete points about the surface of shell 2; and that thermal junctions 4b are in a tangential relationship with insulated sheet 7 and, hence, sense the temperatures at a similar multiplicity of discrete points about the inner wall of the heat sink. For purposes of discussion, thermal junctions 4a will be called the "hot junctions" and thermal junctions 4b the "cold junctions."

The electrical performance of the thermopile so described is, as is well known, such that oppositely polarized voltages are generated at the hot and cold junctions. By virtue of this characteristic, the output signal of the thermopile is a differential voltage whose magnitude is proportional to the difference in temperature between the bulk solutions and the heat sink. To permit this temperature to be directly measured, the heat sink should be maintained at a relatively constant reference temperature. This is accomplished by proportioning its physical geometry so that it can absorb the total heat generated by the chemical reaction without having its temperature appreciably increased.

The heat developed during the chemical reaction, it will be appreciated, is conducted first to the metallic shell 2 and, thence, via the individual turns of the thermopile to the sink. Since a typical thermopile may contain thousands of these turns, the heat is exhausted from the reaction vessel at a relatively high rate. Consequently, the output voltage wave form rapidly increases to a maximum. Its amplitude at any one time, it will be appreciated, is proportionate to the rate of heat flow from the vessel to the sink. Furthermore, since the heat has access to the sink via a multiplicity of shunt paths, the duration of this wave form will be relatively short, decreasing exponentially to its original base level. It will also be understood that by integrating the output signal overtime, the total heat produced by the reaction can be ascertained.

Instead of constructing the area thermopile from a single, helical wire, a pair of such wires 12 and 13 in a side-by-side relationship can be wound about the metallic shell as shown in FIG. 3. The winding scheme illustrated in FIG. 2 is again followed so that successive thermal junctions of each of the helical wires again sense the hot and cold surfaces of the reaction vessel and the heat sink, respectively. Corresponding ends of these wires are connected together at point 14 so that the current flows around the adjacent, circular coils, such as 15 to 16, and through confronting turns of the helices in opposite directions. This current opposition compensates for induction currents. However, to keep the potentials developed at the two sets of hot and cold junctions of the series circuit thus formed additive, one of the helical wires is reversed as shown in FIG. 4 so that confronting half sections of adjacent turns are of the same metallic composition. In this last-mentioned figure, the hot junctions are identified by arrows 12a and 13a; the cold junctions, by arrows 12b and 13b.

Figure 6:
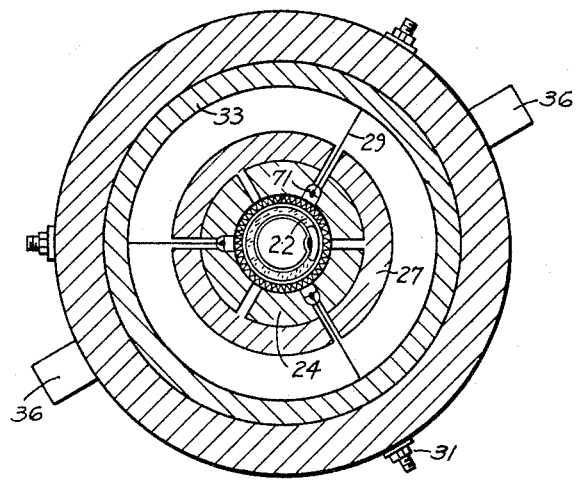
FIG. 6 is a cross section taken through the equatorial plane of the apparatus of FIG. 5.

FIG. 5 is essentially a longitudinal sections of a preferred embodiment of the present invention wherein the twin calorimeter concept is employed to compensate for temperature fluctuations of the heat sink. In this arrangement a reaction vessel 20 and a blank vessel 21, both having the same physical configuration, fluid and heat capacity, cooperate with a pair of metallic shells and complementary area thermopiles, generally represented by reference characters 22 and 22, in a manner similar to that hereinbefore described in connection with FIG. 1. Here, the surrounding heat sink 24, however, takes the form of a bored, cylindrical, metallic block subdivided into three 120° arcuated sectors. This construction which is best shown in FIG. 6, a section view taken through the equatorial plane of the apparatus of FIG. 5, permits the heat sink to be assembled about the area thermopiles without damaging or otherwise impairing the outer boundary junctions of the thermopiles. The three sections are held together firmly by annular, metallic, end rings 25, the apertures of which are closed by removable, flat, circular, metallic covers 26. Heavy metallic caps 27, preferably of aluminum, are attached to the heat sink on both ends thereof so as to increase the heat capacity of the system and provide a thermal short circuit between the various sectors. These caps are kept in place by self-holding tapers which mate their inside diameter to the outside diameter of the cylindrical heat sink.

An annular, metallic or nonmetallic ring 28 serves as the main supporting means for keeping the heat sink in its proper position. In order to achieve this support with a minimum of thermal conduction, three wires or rods 29, terminating at each end in a threaded member or length 30, are employed in a symmetrical arrangement as best known in FIG. 5. These wires pass through suitable clearance holes cut in ring 28, and caps 27, and in each of the three different sectors of the heat sink, and their threaded extremities cooperate with suitable locking nuts 31 which rest on thermally nonconducting washers 32 sealed in recesses 70 and 71 formed in the outer wall and inner wall of ring 28 and heat sink 24 respectively. The dimensions of the clearance holes and the wires are selected so as to insure the presence of a sufficient air gap between these wires and the adjacent surrounding metallic surfaces of the heat sink.

The form of radial suspension permits the heat sink and its affiliated closure members to be enclosed in turn by a pair of U-shaped Dewar vessels 35 for further protection against external temperature variations. Secured to the outer rims of these vessels by adhesive or any other suitable bonding substance are circular collars 33 which have L-shaped cutout portions that register with ring 28 when bolts 34 are in place. Thus, confronting neck portions of the Dewar vessels are almost in contact except for the small clearance dimension provided for the passage of the different suspension wires. By positioning these wires in the equatorial plane of the heat sink, the inevitable heat transfer along these wires, as mentioned hereinbefore, is less serious since it affects the reaction and blank halves of the instrument in a similar manner.

For rotation of the complete instrument about its transverse axis, a pair of shafts 36, FIG. 6, pointing to the center of the heat sink are attached to the suspension ring 28 at diametrically opposite points thereof. Also fastened to the suspension ring 28 are a pair of metallic closure members 38. The space between these members and the Dewar vessels 35 is filled with insulating light material such as styrofoam. Three equally spaced clamps 37, only one of which is shown, hold together shells 38, fastening them simultaneously to the suspension ring with a radial screw passing through the middle of the clamp into the ring. Thus the calorimeter apparatus and the Dewar vessels are both given a further degree of isolation from the surrounding environment. Secured to the opposite ends of these members 38 and in coaxial alignment are a pair of sheaves 39 which rest in the loops of a pair of nylon strings 40 suspended from pulleys directly overhead. It will thus be seen that two independent modes of rotation are available for mixing the bulk solutions in the reaction vessel. The first involves rotation about the transverse axis of the apparatus as defined by shafts 36, suitable bearing support being provided therefor by any conventional arrangement, and the second involves rotation around the longitudinal axis. This last type of rotation is achieved by pulling the supporting strings which form one closed loop each around one of the sheaves and a pulley above. Gravitational forces are thus the only forces performing the mixing operations.

Figure 7:
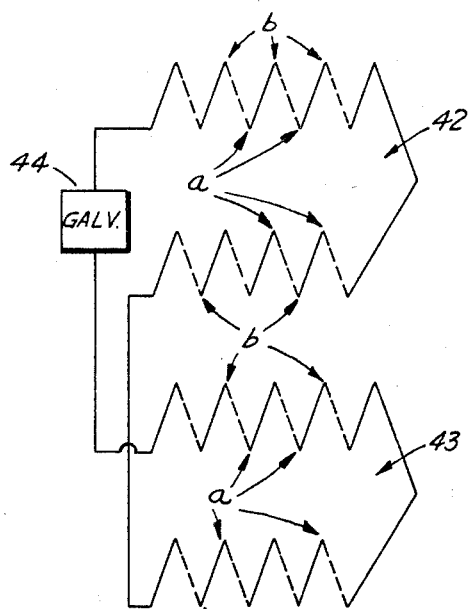
FIG. 7 is a wiring diagram indicating the manner in which the thermopiles of the blank and reaction vessel are connected.

The two terminals from each of the two double coils for the reaction vessel and the blank are brought to the outside through suitable outlets and wired oppositely in series for amplification and potentiometric recording. This wiring scheme is shown in FIG. 7, where the area thermopiles 42 and 43, each formed with a pair of helical wires, are connected to galvanometer 44. From a study of this figure, it will be seen that the hot junctions $a$ and the cold junctions $b$ of thermopile 42 are in an additive arrangement, and the same is true with respect to the same junctions of thermopile 43. However, both pairs of hot and cold junctions are in series opposition in the over-all series circuit. In this manner, changes in the heat sink temperature, as well as heat generated by the mixing motion, are largely compensated.

The main consideration determining the construction of the reaction vessel and the blank comes from the previous stated requirement that the reaction solutions be spread over the largest obtainable surface area. To achieve this dispersal, all of the reactant vessels are of cylindrical shape and accommodate their content between concentric, cylindrical walls. Preferably, these walls should be approximately one-eighth of an inch apart, a dimension found to be the narrowest space in which liquids may be easily moved for mixing. In one simple design, shown by FIG. 8, the more copious reactant fills the annular volume between walls 46 and 47 except for an air space, and the other reactant is accommodated in two drop wells or dimpled recesses 48 and 49, located along the upper tangent of the inner wall. Filling holes 50 and 51 are provided in alignment with each of the above wells, and these holes may be sealed with conical stoppers, such as 52, after the filling operation has been carried out.

FIG. 9 shows an alternative construction for the reaction vessel wherein the fluids are kept apart prior to mixing by a longitudinal wall 53 extending between the inner and outer cylindrical wall surfaces 54 and 55. Normally, that is, during the filling operation, the vessel is positioned as shown. When the vessel is rotated and the dividing wall moved from its horizontal bottom position, mixing of the fluids takes place. The filling holes, of course, are located on opposite sides of the divider so that when the vessel is initially filled the reactants flow down to opposite sides of this barrier.

A bicompartmented reaction vessel is shown in FIG. 10. Here, the different reactants are kept apart by means of a circular wall 57 in the equator of the vessel. A kidney-shaped hole 58, shown in FIG. 11, is provided near the top of this wall for allowing the mixing to take place when the vessel is displaced from its horizontal position. The separating wall is part of a joiner ring 59 which fits within two cylindrical shells 60 and 61 whose inner and outer walls cooperate with those of the ring to form a completely enclosed vessel. It would be pointed out in connection with this construction that the outer diameter of joiner ring 59 is slightly less than the inside diameter of the outer cylindrical walls of shells 60 and 61 so that these members can be brought into an abutting relationship when the apparatus is assembled.

In FIG. 12 there is illustrated a reaction vessel construction utilizing a pair of cylindrical shells 63 and 64 with fixed cone rings 65 and 66 formed at one of their extremities. The free ends of the shells and the outer and inner surfaces of rings 65 and 66, respectively, have mating tapers, a provision which simplifies the assembly of the vessel.

Figure 13:
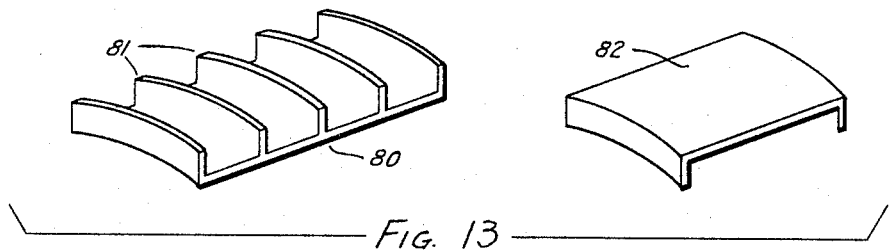
FIG. 13 shows the construction of a drop holder for use with metallic vessels.

In the case of metallic vessels where wells cannot be readily formed, it is possible, nevertheless, to react drops of solutions by means of the drop holder shown in FIG. 13. This holder consists of an arcuated base member 80 having a multiplicity of parallelly spaced, upstanding walls 81 depending therefrom. A snap-on closure lid 82 completes the assembly. In practice, the drop holder is loosely attached to the cylindrical outer shell of the reaction vessel by means of a trace of silicon grease, in the position shown in FIG. 12. The compartments formed by adjacent walls are first filled with one of the reactants by means of a syringe and needle. Thereafter, the vessel is turned 180° so that the drop holder, in effect, hangs from the "ceiling." The bulk solution is then added through filling holes 68. It would be mentioned in connection with this type of drop holder that capillary attraction serves to maintain the fluid in place within the various compartments until mixing is performed.

Figure 14:
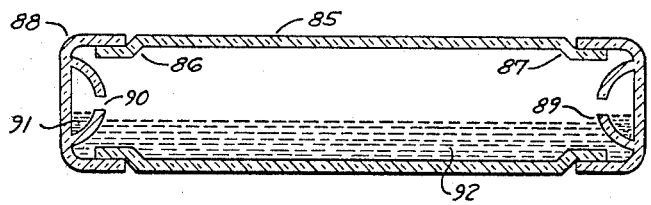
FIG. 14 shows a reaction vessel for investigating bacterial or cell cultures.
Figure 15:
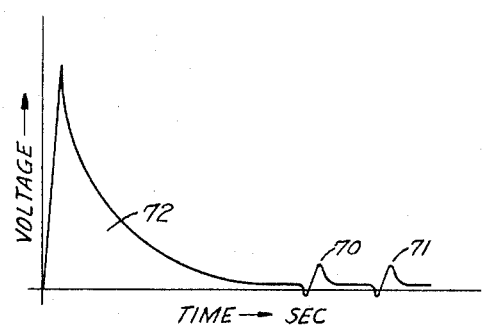
FIG. 15 is a plot of voltage output of the thermopiles versus time in response to the "burst" of heat from an instantaneous chemical reaction.

In FIG. 14 there is shown a reaction vessel having the size and shape of a regular test tube which can be employed with living material such as, for example, bacterial or cell cultures. This apparatus consists of a tubular member 85 having its end portions 86 and 87 of reduced diameter and a pair of cap members 88 provided with inwardly directed, domelike compartments 89. Each Each domelike compartment has at its apex an access aperture 90. In practice, the vessel is inserted within the calorimeter and revolves continuously around its longitudinal axis. This type of rotation maintains an equilibrium of oxygen tension in the gas, liquid and cell phases. The end compartments accommodate substances 91 which are to be mixed at a predetermined time with the bulk suspension 92, for example, adding virus to a cell culture or adding enzyme poison to stop all metabolic activity, thereby to establish the zero base level of the system at the end of a particular recording operation.

The various reaction vessels above described may be made of glass, plastic or metal. To avoid the formation of galvanic elements, a phenomenon which adversely affects the precision of the instrument, vessels of pure gold can be used. The advantage of metals is in the free mobility of electrons therethrough. With nonconducting walls, electric charges are apt to build up locally where the reactants are strong ionic solutions. The energy exchanged in the build-up or breakdown of these charge patterns is a disturbing influence in delicate work of the type where changes of ionic strength are required to initiate the reaction. Needless to say, it is, of course, a requirement of the present system that both the reactant vessel and the blank be formed of the same material, have the same design and contain similar quantities of liquids to have similar heat capacity.

A typical operation of the heat-burst calorimeter begins with filling and sealing the reaction vessel and blank vessel. Then, the reaction vessel and the blank are inserted within the heat sink. Thereafter, the various end plates and caps are secured in place. The apparatus is next left undisturbed until a condition of zero change in heat flow is observed by examining the output of the thermopiles. When thermal equilibrium has been established, the reaction can be carried out by gravitational mixing of the various fluids, the exchange of heat being recorded continuously by suitable voltage indicating means. The operation terminates with repeated recordings of the heat generated by the mixing motion alone. Of course, it should be recognized that solutions of reactants not used in excess be measured into the vessels in a quantitative manner by either volume or weight.

As a further refinement, after filling, one of the access holes in each vessel is sealed and then both vessels are set in the calorimeter block so that one filling hole of each vessel remains accessible. After approximately one-quarter of an hour, the potential from the thermopiles is observed. When this signal has dropped to one millivolt or less, the holes are sealed and the vessels pushed into their final positions. In this way, pressure differentials in the vessels due to temperature changes are minimized and leakage through the seals, evaporation or condensation avoided. It would be pointed out at this time that cooling must not occur at any time during or after the filling operation. If any cooling does occur, moisture forms at the inner surfaces of the vessel because of condensation, and this pure water will upon mixing, dilute the reactant solutions and introduce as a source of error into the measurement, the heat of dilution involved. Thus, the various liquids should preferably be moderately cooler than the calorimeter before the filling operation is undertaken. By the same token, overwarming by handling must be avoided while the vessels are being prepared.

As mentioned hereinbefore, the output potential of both thermopiles is monitored during the period preceding thermal equilibrium. This potential will fall exponentially from an original value to a base level, which level will be less than a few percent of the potential expected to arise from the reaction, the time required for this decrease depending upon how far the temperatures of the vessel had been initially different from the calorimeter temperature. The true base line of the system or the point of stability can be checked by shorting the thermopile.

With drop vessels like those shown in FIG. 8, the mixing is achieved by rotating the instrument around the longitudinal axis according to the following sequence: 180° forward, 360° backward, 360° forward, 180° backward. With bicompartmented vessels like those shown in FIG. 10, the following sequence around the transverse axis was found efficient: 90° right, pause, 180° right, pause, 270° left. This is followed by rotation around the horizontal axis 90° forward, the vessel being permitted to stay in this position for approximately three seconds before turning back 90°, this last displacement being performed to establish similar levels of liquids in both compartments. Now the motions used previously for mixing are meticulously repeated, not only in sequence, but also, as far as possible, in speed and acceleration. This produces the zero spikes or mixing blanks of heat shown by pulses 70 and 71 in FIG. 13, which figure is a plot of output voltage versus time. It will be appreciated that the last-mentioned pulses represent the the heat changes introduced artificially by the mixing motions. They arise from inversions of thermal gradients in the liquids, from heat of friction, changes of pressure associated with evaporation or condensation in the vessel and from other unknown causes. The area under the zero spike, of course, must be added to or subtracted from the area of the main potential curve 72. A second zero spike should be recorded to ascertain the true amount of heat change introduced by the mixing operation. If the first and second spikes are not alike, a condition which is usually due to leftover heat of reaction caused by an incomplete first mixing of the solutions, a third zero spike should be formed to find how much of the reactants had not been originally mixed.

In order to calibrate or otherwise ascertain the precision of the complete system, a small electrical heater can be inserted into the reaction vessel and a known amount of current supplied thereto. Of course, the reactant vessel in question should contain a known amount of water or a similar inert fluid. Knowing the amount of heat introduced into the system and the area under the output voltage curve, the performance of the apparatus can be checked. Another method for calibration is to carry out a measurement of heat with a reaction of known heat change, for example, the formation of water from known quantities of hydrogen and hydroxyl ions (acid reacting with base).

Obviously many modifications and variations of the present invention are possible in the light of the above teachings. It is therefore to be understood that within the scope of the appended claims the invention may be practiced otherwise than as specifically described.

What is claimed is:

1. For use in a heat-burst microcalorimeter, the subcombination of a reaction vessel, a helical conductor made of a first metal, each turn thereof having a corresponding half-length portion plated with a second metal whereby a first and second series of oppositely polarized thermal junctions are formed, said helical conductor being coiled about the surface of said reaction vessel such that said first series of thermal junctions senses the temperature of said vessel at a multiplicity of points, means for maintaining said second series of thermal junctions at a substantially constant temperature, said means for maintaining said second series of thermal junctions at a substantially constant temperature including a hollow metallic cylindrical heat sink, said second series of thermal junctions being in thermal contact with the inner wall of said heat sink.

2. For use in a heat-burst microcalorimeter, the subcombination of a helical conductor made of a first metal, each turn thereof having a corresponding half-length portion plated with a second metal whereby a first and second series of thermal junctions are formed, a reaction vessel, a metallic heat sink, said helical conductor being coiled between said reaction vessel and said heat sink such that the turns of said helical conductor serve as a multiplicity of heat conducting paths for discharging the heat generated within said reaction vessel into said heat sink with said first and second series of thermal junctions sensing the temperature of said reaction vessel and the temperature of said heat sink, respectively.

3. A heat-burst microcalorimeter comprising the combination of a cylindrical reaction vessel, a concentric cylindrical heat sink surrounding said reaction vessel, a helical conductor formed of a first metal, each turn of said helical conductor having a corresponding half-length portion plated with a second metal whereby a first and second series of oppositely polarized thermal junctions are formed, said helical conductor being coiled about said reaction vessel such that said first series of thermal junctions senses the temperature of said reaction vessel at a multiplicity of points and said second series of thermal junctions senses the temperature of said heat sink at a corresponding multiplicity of points, and means for indicating the magnitude of the differential voltage produced by said first and second series of thermal junctions.

4. A heat-burst microcalorimeter comprising, in combination, a metallic sleeve, a cylindrical heat sink concentrically disposed with respect to said sleeve, electrical insulation covering the outer and inner surfaces of said sleeve and heat sink, respectively, a thermopile, said thermopile comprising a helical conductor made of a first metal, each turn of said helical conductor having a corresponding half-length portion plated with a second metal whereby a first and second series of oppositely polarized thermal junctions are formed, said thermopile being coiled about said sleeve such that said first series of thermal junctions are in a tangential relationship with the insulation covering said sleeve and said second series of thermal junctions are in a tangential relationship with the insulation covering said heat sink and means for preventing shorting of adjacent turns of said coiled thermopile.

5. In an arrangement as defined in claim 4, a reaction vessel disposed within said sleeve, the outer surface of said reaction vessel being in thermal contact with the inner surface of said sleeve and means for providing an indication of the magnitude of the output voltage of said thermopile when a heat producing reaction occurs within said reaction vessel.

6. A heat-burst microcalorimeter comprising, in combination, a first and second thermopile, each thermopile consisting of a helical conductor of a first metal with each turn of said helical conductor having a corresponding half length portion plated with a second metal whereby a first and second series of oppositely polarized thermojunctions are formed, said first thermopile being coiled such that its first series of thermojunctions are disposed in a first helix and its second series of thermojunctions are disposed in a second helix of increased radius, said second thermopile being coiled such that its first series of thermojunctions are also disposed in a first helix and its second series of thermojunctions are also disposed in a second helix of increased radius, means for connecting said first and second thermopiles in electrical series opposition, means for maintaining the second series of thermojunctions of said first and second thermopiles at a substantially constant temperature and means for indicating the magnitude of the differential voltage developed by the series opposition relationship of said first and second thermopiles when a heat source is placed within one of said coiled thermopiles and is sensed by the first series of thermojunctions of that thermopile.

7. In an arrangement as defined in claim 6, wherein said means for maintaining the second series of thermojunctions of said first and second thermopiles at a substantially constant temperature comprises a hollow cylindrical metallic heat sink, the inner surface of said heat sink being electrically nonconducting, said heat sink being concentrically disposed with respect to said coiled thermopiles and dimensioned such that the second series of thermojunctions of said first and second thermopiles contact the electrically nonconducting surface of said heat sink.

8. In an arrangement as defined in claim 7, means for supporting said heat sink at points located midway between the ends of said cylindrical heat sink, said points being equally spaced about the peripheral surface of said heat sink.

9. A heat-burst microcalorimeter comprising, in combination, a shell-like supporting means made of a material that is thermally conductive, the outer surface of said shell-like supporting means being electrically nonconducting, a first and second thermopile, each thermopile consisting of a helical conductor of a first metal, each turn of said helical conductor having a corresponding half length portion plated with a second metal whereby each thermopile contains a first and second series of oppositely polarized thermojunctions, said first thermopile being coiled about one half of said shell-like supporting means and said second thermopile being coiled about the other half of said shell-like supporting means such that said first series of thermojunctions of said first and second thermopiles contact the outer surface of said shell-like supporting means, a metallic heat sink having a cylindrical bore, the surface of said bore being electrically nonconducting, said shell-like supporting means being disposed within said bore such that the second series of thermojunctions of said first and second thermopiles contact the electrically nonconducting surface of said bore, means for connecting said first and second thermopiles in series opposition and means for recording the wave form of the differential voltage developed by said first and second thermopiles when a heat producing reaction takes place within one half of said shell-like supporting means.

10. In an arrangement as defined in claim 9, a pair of similarly constructed reaction vessels disposed within said shell-like supporting means, said vessels occupying different half portions of said shell-like supporting means with the outer surface of said reaction vessels being in thermal contact with the inner surface of said shell-like supporting means.

11. In an arrangement as defined in claim 10, means for supporting said heat sink at points equidistant from opposite ends of said heat sink whereby heat introduced into the system by said supporting means equally affects said first and second thermopiles.

12. In a heat-burst mircrocalorimeter of the type wherein a pair of similarly constructed vessels are in spaced coaxial alignment, with one of said vessels serving as the reaction vessel and the other as the standard vessel, a hollow, cylindrical heat sink surrounding said vessels, a first and second thermopile, each thermopile comprising a helical conductor made of a first metal with each turn thereof having a corresponding half-length portion plated with a second metal whereby a first and second series of oppositely polarized thermal junctions are formed, each helical conductor being wound in an elongated coil such that the first series of thermojunctions of each thermopile are in thermal contact with said vessels and the second series of thermojunctions of each thermopile are in thermal contact with the inner surface of said hollow, cylindrical heat sink whereby said first and second thermopiles act as low thermal impedance means for discharging rapidly any heat produced within said vessels into said heat sink while simultaneously developing an electric signal indicative of the amount of heat so discharged, said first and second thermopiles being connected in electrical series opposition and means for recording the output of said thermopiles when a heat producing reaction takes place within said reaction vessel.

13. In an arrangement as defined in claim 12, means for supporting said heat sink at spaced circumferential points which are midway between the confronting ends of said reaction and standard vessels.

14. In an arrangement as defined in claim 12, a pair of U-shaped, vacuum jars enclosing said hollow, cylindrical heat sink to isolate said heat sink and said reaction and standard vessels from external temperature variations, the open ends of said vacuum jars being equally spaced from a plane that is midway between the confronting ends of said reaction and standard vessels.

15. A heat-burst microcalorimeter comprising, in combination, a shell-like supporting means made of a material that is thermally conductive, the outer surface of said shell-like supporting means being electrically nonconducting, a first and second thermopile, each thermopile consisting of a helical conductor of a first metal, each turn of said helical conductor having a corresponding half-length portion plated with a second metal whereby a first and second series of oppositely polarized thermojunctions are formed at diametric points of each turn, said first thermopile being coiled about one complete half of said shell-like supporting means and said second thermopile being coiled about the complete other half of said shell-like supporting means such that said first series of thermojunctions of said first and second thermopiles contact the outer surface of said shell-like supporting means, a metallic heat sink having a cylindrical bore, the surface of said bore being electrically nonconducting, said shell-like supporting means being disposed within said bore such that said second series of thermojunctions of said first and second thermopiles contact the electrical nonconducting surface of said bore, a ring member circling said heat sink, said ring member being disposed in a plane which is midway between the opposite ends of said shell-like supporting means, a plurality of struts interconnecting said heat sink to said ring, said struts being equally spaced around said ring whereby heat introduced into said heat sink from said struts has the same effect on said first and second thermopiles, a pair of U-shaped vacuum vessels enclosing said heat sink with the confronting open ends of said vacuum vessels being in contact with said struts and means for recording the wave form of the differential voltage developed by said first and second thermopiles when a heat source is placed within one half of said shell-like supporting means and is sensed by the first series of thermojunctions of the thermopile which is coiled about that half of said shell-like supporting means.

References Cited by the Examiner

UNITED STATES PATENTS

| | | | |
|---|---|---|---|
| 1,594,370 | 8/1926 | Kubota | 235—259 |
| 1,594,593 | 8/1926 | Boertlein | 23—252 |
| 1,660,974 | 2/1928 | Porro | 23—259 |
| 2,310,026 | 2/1943 | Higley. | |
| 2,417,923 | 3/1947 | Frisk | 73—361 X |
| 2,631,925 | 3/1953 | Cohn | 23—252 |
| 2,800,793 | 7/1957 | Oliver | 73—190 |
| 2,807,657 | 9/1957 | Jenkins et al. | 136—4 |
| 2,911,824 | 11/1959 | Czerlinsky et al. | 73—190 |
| 3,059,471 | 10/1962 | Calvet | 73—190 |

FOREIGN PATENTS 953,800   5/1949   France.

OTHER REFERENCES

Article by T. Benzinger et al., published by Naval Medical Research Institute, February 1955, National Naval Medical Center, Bethesda, Md., entitled, Microcalorimetric Determination of the Heat of Hydrolysis of Adenosine-Triphosphate, and being a translation of a German Report published in Zeitschrift fur Naturforschung.

Periodical: The Review of Scientific Instruments, article by Benson et al., entitled, Adiabatic Calorimeter for Measuring Heats of Solution at Room Temperature, May 1955 issue, pp. 477–481.

Article by J. B. Stott in Journal of Scientific Instruments, vol. 33, No. 2, February 1956, pp. 58–63.

Periodical: The Review of Scientific Instruments, vol. 29, No. 6, June 1958, pp. 491–496, article by Attree et al. entitled, Differential Calorimeter of the Tian-Calvet Type.

RICHARD C. QUEISSER, *Primary Examiner.*

ROBERT EVANS, JOHN P. BEAUCHAMP, *Examiners.*